United States Patent [19]

Sundie et al.

[11] 4,011,363

[45] Mar. 8, 1977

[54] CURABLE AMINO RESINS

[75] Inventors: Richard D. Sundie, Montvale; Walter L. Pennie, Morristown, both of N.J.

[73] Assignee: Allied Chemical Corporation, Morris Township, N.J.

[22] Filed: May 18, 1976

[21] Appl. No.: 687,572

Related U.S. Application Data

[60] Division of Ser. No. 530,313, Dec. 6, 1974, Pat. No. 3,979,492, which is a division of Ser. No. 431,535, Jan. 7, 1974, Pat. No. 3,891,590, which is a continuation of Ser. No. 210,160, Dec. 20, 1971, abandoned.

[52] U.S. Cl. .............................. 428/524; 428/526; 428/528; 428/530
[51] Int. Cl.$^2$ ................................. B32B 27/42
[58] Field of Search ............... 260/29.4 R, 67.6 R; 264/109, 119, 128; 428/288, 290, 443, 524, 526, 528, 530

[56] References Cited

UNITED STATES PATENTS

| | | | |
|---|---|---|---|
| 3,458,464 | 7/1969 | Shriver et al. | 260/29.4 R |
| 3,629,176 | 12/1971 | Shriver | 260/29.4 R |
| 3,730,828 | 5/1973 | Meiser | 428/528 |
| 3,856,562 | 12/1974 | White et al. | 428/526 |

*Primary Examiner*—James J. Bell
*Attorney, Agent, or Firm*—Ernest D. Buff

[57] ABSTRACT

Curable amino resins are prepared from a system having two components, each of which remains storage stable for extended periods of time. The two components are drawn from separate storage vessels and combined in an in-line mixer immediately prior to the point of use. The system reduces mixing costs and provides greater control over changes in viscosity, precipitation and resin particle size occurring during the mixing process. The resins are used as adhesives (binders) for wood fiber, particles and chips, as well as for paper products and plywood materials.

16 Claims, No Drawings

CURABLE AMINO RESINS

This is a division of application Ser. No. 530,313, filed Dec. 6, 1974, now U.S. Pat. No. 3,979,492 which, in turn, is a divisional of Ser. No. 431,535, filed Jan. 7, 1974, now U.S. Pat. No. 3,891,590, which, in turn, is a continuation of Ser. No. 210,160, filed Dec. 20, 1971, now abandoned.

BACKGROUND OF THE INVENTION

1. Field of the Invention

This invention relates to a two component system useful in the preparation of curable adhesives (binders) for wood and paper products, and more particularly to a stabilized liquid composition comprising one of the components. The invention is applicable to any curable adhesives which perform physically as called for hereinafter; but inasmuch as the problem of stabilization is more prevalent with curable adhesives comprising reaction products of compounds which contain an amino ($NH_2$) group and aldehydes, the invention will be described in their connection.

2. Description of the Prior Art

Reaction products of compounds containing an amino group and aldehydes, otherwise known and hereinafter referred to as "amino resins", are conventionally prepared by partially reacting urea or melamine or a mixture thereof with formaldehyde at an elevated temperature to produce a high viscosity plymeric form comprising methylol units. Such polymeric form, with a suitable catalyst, is combined with fibrous particles and, under heat, is further polymerized to a rigid resin.

As a result of mechanical mixing problems caused by the high viscosity of the polymeric form and the tendency of the resin particles resulting therefrom to become unduly large, or attenuated, the initial reaction to the polymeric form must be carried out under controlled conditions. Moreover, once the polymeric form has been produced, the reaction can be permaturely "triggered" to form a rigid resin even in the absence of the catalyst, by the presence of a particular combination of temperature and acidity conditions. Procedures wherein dilute urea, formaldehyde and melamine are combined with heat and then cooled to room temperatures, do not appreciably prolong the pot life of the mixture. The resin cannot be easily stored or shipped, but must be mixed in situ by the user. Individualized mixing neecs, in turn, require substantial duplication of equipment with resultant higher costs for the resin.

SUMMARY OF THE INVENTION

The invention provides a two component system which can be stored and shipped, and from which curable amino resins are easily prepared without serious mixing problems and duplication of mixing machinery. It has been discovered that component I and component II, defined below, can be separately prepared and will remain stable when stored for up to 60 days or more at temperatures ranging from −15° F. to about +120° F. When from about 40 to about 60 parts of component I are combined with correspondingly from about 60 to about 40 parts of component II, the two components immediately commence to react. The reaction, which results in a permanently rigid resin, may be accelerated upon application of heat in a manner hereinafter described.

Component I is a novel stabilized liquid composition consisting essentially of from about 15 to about 25 weight percent urea, from about 30 to about 70 weight percent formaldehyde, from about 4.5 to about 10 weight percent melamine, from about 10 to about 30 weight percent water and from about 0.05 to about 4.0 weight percent stabilizer. Preferably the ingredients of component I consist essentially of from about 20 to about 25 weight percent urea, from about 45 to about 60 weight percent formaldehyde, from about 4.5 to about 6.5 weight percent melamine, from about 20 to about 25 weight percent water and from about 0.1 to about 1.0 weight percent stabilizer.

Component II consists essentially of from about 35 to about 50 weight percent urea, from about 0.5 to about 3.0 percent catalyst, and from about 45 to about 65 weight percent water. Preferably the ingredients of component II consist essentially of from about 40 to about 45 weight percent urea, from about 0.05 to about 1.0 weight percent catalyst and from about 50 to about 60 weight percent water.

The urea and formaldehyde of component I may be added as a commercially available concentrate such as UFC 85, a trademarked product, consisting of 25 weight percent urea, 60 weight percent formaldehyde and 15 weight percent water. The stabilizer may be any suitable buffering agent typically known in the art which, when present in the above prescribed amount, maintains the pH of component I at a value ranging from about 4.0 to about 7.5, preferably from about 5.0 to about 6.5. Suitable stabilizers include ammonium salts of organic acids such as ammonium acetate, ammonium benzoate, ammonium citrate, ammonium cyanate, ammonium formate, ammonium oxalate, ammonium salicyate and ammonium sulfamate; ammonium salts of inorganic acids such as ammonium chlorate, ammonium fluoroborate, ammonium hypophosphite, ammonium iodate, ammonium nitrite, ammonium perchlorate, ammonium periodate, ammonium permanganate, ammonium persulfate and ammonium thiosulfate; inorganic acids such as nitric acid, iodic acid, boric acid, sulfuric acid and hydrochloric acid; organic acids such as acetic acid, citric acid, formic acid, oxalic acid, stearic acid and tartaric acid; and mixtures of ammonium hydroxide and the above named inorganic acids. Of these stabilizers, ammonium acetate, ammonium citrate, ammonium borate, boric acid, sulfuric acid, hydrochloric acid, formic acid, acetic acid, stearic acid and mixture of ammonium hydroxide and boric acid are preferred.

The catalyst of component II may be any of those catalysts conveniently used in the board-making industry which substantially promote the reaction of urea, melamine and formaldehyde. Such catalysts include salts of a weak base and a strong acid such as ammonium chloride, ammonium nitrate, ammonium phosphate, aluminum phosphate, ammonium sulfate, and aluminum ammonium sulfate.

Use of the stabilizer inhibits formation of the precipitate otherwise produced when the mixture of urea, formaldehyde, melamine and water of component I is stored. In addition, the stabilizer reduces the rate of viscosity increase in component I. As a result, components I and II can be separately mixed in relatively large volume amounts and stored in separate vessels for future use without significant reaction losses resulting from precipitate formation and viscosity increases. The two components may subsequently be respectively drawn from the vessels and combined in the relative proportions desired immediately prior to the point of use. The resultant low viscosity amino resins possess no "tack". They can better penetrate and bind cellulosic and other fibrous materials. Stronger and more intimate bonds are developed. Operational efficiencies can be improved and shipping costs reduced. The reduction in viscosity increase and precipitate formation permits components I and II to be combined in a small in-line-mixer without undue attenuation of the resin particles and needless duplication of mixing apparatus costing as much as 70,000 dollars or more.

The invention will be more fully understood and further advantages will become apparent where reference is made to the following detailed description of the preferred embodiments of the invention.

DESCRIPTION OF THE PREFERRED EMBODIMENTS

The stabilized liquid composition comprising component I may be prepared at temperatures ranging from about 50° to about 200° F and at pressures ranging from about 5 to about 50 pounds per square inch, although temperatures in the range of about 70° to about 150° F and atmospheric pressure are preferred. At these conditions the urea, formaldehyde, melamine, water and stabilizer are admixed in any convenient order and in the above prescribed amounts. During the mixing process the ingredients are agitated and preferably heated to a temperature sufficient to rapidly dissolve the melamine, as in the preferred range of about 70°–150° F. When the melamine has dissolved, the mixture is cooled to about 70° F. for storage or shipment.

The reaction proceeds more readily in the absence of the stabilizer. For this reason it is preferable to include the stabilizer at an early point in the mixing process as, for example, by first depositing the stabilizer in a vessel and then separately adding to the stabilizer the prescribed amounts of urea, formaldehyde, melamine and water. When the melamine and stabilizer have dissolved the mixture is cooled to room temperature.

The combined ingredients of component I can be stored and shipped for periods up to sixty days or more at temperatures ranging from about −15° F. to about +115° F. For this reason component I is particularly suited for use in a two component system from which curable amino resins are prepared.

The composition of component II may be conveniently prepared at ambient temperature and atmospheric pressure by mixing together the urea, water and catalyst in the above indicated amounts. Component II is a stable composition and can be stored and shipped for use with component I over similar periods up to 60 days or more.

Before components I and II are combined, they each comprise liquid compositions which, as noted, may be separately stored and shipped for future use. Components I and II may thus be separately manufactured in relatively large quantities, sold as a two component system, and combined by the user in a simple in-line-mixer immediately prior to the point of use. If urea, formaldehyde, melamine, water, and catalyst are combined as a single charge, a mildly exothermic reaction results and a hardened amino resin tends to form in a relatively short period of time. The latter system, therefore, cannot be stored or shipped for future use as an adhesive for wood or paper products.

By allocating the ingredients for producing amino resins in the above described manner to prepare two separate components, each of which contains urea and water, one of which contains a stabilizer, formaldehyde and melamine, and the other of which contains the catalyst, a unique system is created from which curable amino resins can be made without processing or storage difficulties. The system comprises component I and component II, each of which is sufficiently stable to be stored and shipped for future use.

In a specific embodiment of the invention, the pot life of the amino resin which is generally in the order of about 12 hours may be increased to a minimum of about 36 hours by adding ammonium hydroxide to component I, component II or to both in a total amount ranging from about 0.25 to about 2.0, preferably about 0.25 to about 1.5 weight percent of combined components I and II.

The method for preparing amino resins from the two component system is conveniently carried out at ambient temperature and atmospheric pressure. Components I and II are drawn from separate containers by suitable means such as pumps or the like. The two components are then combined with vigorous stirring in a suitable in-line-mixer according to a formulation comprising from about 40 to about 60 parts of component I, and correspondingly from about 60 to about 40 parts of component II, preferably from about 45 to about 55 parts of component I and correspondingly from about 55 to about 45 parts of component II. When employing the preferred proportions of Components I and II, the mol ratio of formaldehyde to urea plus melamine present in the components generally ranges from about 0.7–1.0:1.

The in-line-mixer may be an air driven turbine or other suitable mixing apparatus. Inasmuch as the two components are both in liquid form, they may be quickly combined in the absence of heat at temperatures ranging from about 50° to about 90° F., preferably from about 75° to about 85° F. The mixing time will vary depending on the type of mixing apparatus employed and the batch size.

Amino resins may be prepared from the two component system in the above described manner by a continuous process. In such a process the two components are separately drawn from their respective containers and pumped through suitable piping to the inline mixer. The amino resin, resulting from combination of the two components, is drawn from the mixer and moved by rotary pumping means, for example, to the point of use. In the event that the resin is used an an adhesive binder for fibrous materials, as in the production of fiberboard, the combined ingredients may be pumped from the mixer to a suitable unit for application to the fibrous material.

The following examples, in which parts are by weight are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A reaction vessel equipped with a mechanical stirrer was charged at atmospheric pressure with 23 parts of water, 21 parts of urea, 50.7 parts of formaldehyde and 5 parts of melamine. These ingredients were heated with vigorous stirring to temperature of 150° F. The stirring was continued and the temperature was maintained at 150° F. for 20 minutes during which time the melamine dissolved. The mixture was cooled to 80° F. and 3 parts of ammonium acetate were added thereto. The resultant clear solution, comprising component I was cooled to room temperature and then separated into two equal parts, hereinafter referred to respectively as portion A and portion B. When thus separated, the solution had a viscosity of 175 cps. at 77° F.

The reaction vessel was cleaned and dried to remove all contaminants therefrom, and component II was then prepared by charging the vessel with 56.5 parts of water, and 42.2 parts of urea, to which 1.3 parts of ammonium sulfate were added with vigorous stirring. The stirring was continued for 20 minutes, during which time the ammonium sulfate dissolved. The resultant solution, comprising component II, was then separated into two equal parts, hereinafter referred to as portion C and portion D. When thus separated the solution of component II had a viscosity of 10 cps. at 77° F.

Portions A and C were respectively stored in separate containers for 60 days at ambient temperatures. Portions B and D were immediately used in the preparation of an amino resin as described hereinafter in more detail.

The reaction vessel was cleaned and dried to remove all contaminants therefrom, and a curable amino resin was prepared by charging the vessel at atmospheric pressure and room temperature with 52 parts of portion B, to which 43 parts of portion D were added with vigorous stirring. Such stirring was continued for 5 minutes, during which time an amino resin solution was formed having a viscosity of 25 cps. at 77° F. and a solids content of 50 weight percent.

The resin solution, hereinafter called resin R, was then sprayed onto particles of mechanically reduced wood fiber, until the particles became impregnated with resin R. The amount of the spray was regulated so that the resin solids content of the fiber was 8 percent of the oven dry (O.D.) weight of the fiber. The impregnated fibers were formed into a mat. Such mat was compressed for 1 minute between press platens heated to 280° F. using high frequency (H.F.) heating. A fiberboard was thereby produced having a thickness of 0.5 inch. The board, hereinafter called board H, had a uniform density of 47 pounds per cubic foot and was free of interface weakness.

Sixty days later a curable amino resin was prepared by combining portions A and C in the reaction vessel according to the same procedure, temperatures, proportions and conditions used to produce resin R. The resulting amino resin solution formed, hereinafter called resin S. had a viscosity of 30 cps. at 77° F. and a solids content of 50 weight percent. A fiberboard, was then prepared from resin S using the same procedure, materials, temperatures, proportions and conditions used to prepare board H. The resultant board, hereinafter called board I had a uniform density of 47 pounds per cubic foot and was free of interface weakness.

A series of further runs was conducted using the same procedures used to prepare component I, component II, portions A-D, resins R and S. and boards H and I in the above example. The specific ingredients, conditions, and resulting data of Example 1 and the subsequent runs (Examples 2 to 7) are set forth in the following table.

| Example | | | 1 | 2 | 3 | 4 | 5 | 6 | 7 |
|---|---|---|---|---|---|---|---|---|---|
| Component I | Water (parts) | | 23.00 | 23.00 | 23.00 | 23.00 | 18.21 | 22.89 | 16.61 |
| | Urea (parts) | | 21.00 | 21.09 | 21.09 | 21.09 | 22.50 | 21.09 | 21.09 |
| | Formaldehyde (parts) | | 50.70 | 50.62 | 50.62 | 50.62 | 54.00 | 50.62 | 54.00 |
| | Melamine (parts) | | 5.00 | 4.96 | 4.96 | 4.96 | 4.96 | 5.30 | 5.30 |
| | Stabilizer* (parts) | | 0.30 | 0.33 | 0.33 | 0.33 | 0.33 | 0.10 | 3.00 |
| | Mixing | - Temperature (° F) | 150 | 150 | 150 | 150 | 150 | 150 | 150 |
| | | - Time (min.) | 20 | 20 | 20 | 20 | 20 | 20 | |
| | Portion A | - Viscosity (cps.) after storage | 950 | 400 | 400 | 1100 | 443 | 400 | 3125 |
| | | - Storing Time (days) | 60 | 30 | 30 | 60 | 60 | 30 | 60 |
| | Portion B | - Viscosity (cps.) | 175 | 232 | 232 | 232 | 160 | 160 | 222 |

*Example:
(1) NH₄Ac (Ammonium Acetate)
(2) NH₄Ac
(3) NH₄Ac
(4) NH₄Ac
NH₄Ac
(6) Boric Acid (1 part) NH₄OH (2 parts)
NH₄Ac

| Example | | | 1 | 2 | 3 | 4 | 5 | 6 |
|---|---|---|---|---|---|---|---|---|
| Component II | Water (parts) | | 56.50 | 56.89 | 56.89 | 56.89 | 56.89 | 56.89 |
| | Urea (parts) | | 42.20 | 42.00 | 42.00 | 42.00 | 42.00 | 42.00 |
| | Catalyst** (parts) | | 1.30 | 1.11 | 1.11 | 1.11 | 1.11 | 1.11 |
| | Mixing | - Temperature (° F.) | 75 | 75 | 75 | 75 | 75 | 75 |
| | | - Time (min.) | 20 | 20 | 20 | 20 | 20 | 20 |
| | Portion C | - Viscosity (cps.) after storage | 10.0 | 15.0 | 15.0 | 15.0 | 7.5 | 15.0 |
| | | - Storing Time (days) | 60 | 30 | 30 | 60 | 60 | 30 |
| | Portion D | - Viscosity (cps.) | 7.5 | 7.5 | 7.5 | 7.5 | 7.5 | 7.5 |

| Example | 1 | 2 | 3 | 4 | 5 | 6 | |
|---|---|---|---|---|---|---|---|

**Example:
(1) $(NH_4)_2SO_4$
(2) $(NH_4)_2SO_4$
(3) $(NH_4)_2SO_4$
(4) $NH_4NO_3$
(5) $(NH_4)_2SO_4$
(6) $(NH_4)_2SO_4$
(7) $(NH_4)_2SO_4$

| Example | | 1 | 2 | 3 | 4 | 5 | 6 | 7 |
|---|---|---|---|---|---|---|---|---|
| Resin R | Portion B - (parts) | 52.0 | 52.0 | 52.0 | 52.0 | 52.0 | 52.0 | 52.0 |
| | Portion D - (parts) | 48.0 | 48.0 | 48.0 | 48.0 | 48.0 | 48.0 | 48.0 |
| | Mixing - Temperature (° F.) | 75 | 75 | 75 | 75 | 75 | 75 | 75 |
| | - Time (min.) | 5 | 1 | 1 | 1 | 1 | 1 | 1 |
| | Viscosity - (cps.) | 25.0 | 20.0 | 20.0 | 20.0 | 21.0 | 20.0 | 15.0 |
| | Solids in resin (%) | 50.0 | 50.5 | 50.5 | 50.5 | 51.0 | 50.5 | 50.0 |
| Resin S | Portion A - (parts) | 52.0 | 52.0 | 52.0 | 52.0 | 52.0 | 52.0 | 52.0 |
| | Portion C - (parts) | 48.0 | 48.0 | 48.0 | 48.0 | 48.0 | 48.0 | 48.0 |
| | Mixing - Temperature (° F.) | 75 | 75 | 75 | 75 | 75 | 75 | 75 |
| | - Time (min.) | 5 | 1 | 1 | 1 | 1 | 1 | 1 |
| | Viscosity (cps.) | 30.0 | 22.5 | 22.5 | 32.5 | 25.0 | 25.0 | 27.5 |
| | Solids in resin (%) | 50.0 | 50.3 | 50.3 | 50.0 | 51.0 | 51.0 | 50.0 |

| Example | | 1 | 2 | 3 | 4 | 5 | 6 | 7 |
|---|---|---|---|---|---|---|---|---|
| | Type Fiber | Mixed Hardwoods | Southern Pine | Mixed Hardwoods | Mixed Hardwoods | Southern Pine | Southern Pine | Mixed Hardwood |
| Board H | Resin Content (Wt. % dry fiber) | 8 | 8 | 8 | 8 | 8 | 8 | 8 |
| | Mat thickness (in.) | 4 | 4 | 4 | 4 | 4 | 4 | 4 |
| | Pressing - Platin Temperature (° F.) | 280 | 325 | 325 | 325 | 325 | 270 | 325 |
| | - Time (min.) (Hi Frequency) | 1 | 1 | 1 | 1 | 1 | 1 | 1 |
| | Board Thickness (in.) | 0.50 | 0.50 | 0.50 | 0.50 | 0.50 | 0.50 | 0.50 |
| | Board Density (lbs./cu.ft. O.D.) | 47.0 | 46.0 | 44.6 | 44.5 | 46.4 | 46.0 | 39.8 |
| | Modulus of Rupture (psi) | — | 2,692 | 4,704 | 3,380 | 2,824 | 3,214 | 3,050 |
| | Internal Bond (psi) | — | 133 | 184 | 166 | 135 | 146 | 181 |
| | Screw Holding (lbs.) | — | 405 | 408 | 478 | 431 | 424 | 299 |
| | After 24 hr. immersion in water - | — | | | | | | |
| | - Thickness Swell (%) | — | 4.6 | 3.8 | 3.9 | 4.5 | 1.7 | 3.5 |
| | -Water Absorption (%) | — | 10.8 | 17.5 | 12.6 | 10.1 | 11.0 | .02 |

| Example | | 1 | 2 | 3 | 4 | 5 | 6 | 7 |
|---|---|---|---|---|---|---|---|---|
| Board I | Resin Content (wt. % of dry fiber) | 8 | 8 | 8 | 8 | 8 | 8 | 8 |
| | Mat thickness (in.) | 4 | 4 | 4 | 4 | 4 | 4 | 4 |
| | Pressing - Platin Temperature (° F.) | 280 | 325 | 325 | 325 | 325 | 325 | 325 |
| | - Time (min.) (Hi Frequency) | 1 | 1 | 1 | 1 | 1 | 1 | 1 |
| | Board Thickness (in.) | 0.50 | 0.50 | 0.50 | 0.50 | 0.50 | 0.50 | 0.50 |
| | Board Density (lbs./cu.ft. O.D.) | 47.0 | 47.3 | 49.3 | 50.3 | — | 47.9 | 40.5 |
| | Modulus Rupture (psi) | — | 3662 | 4100 | 4000 | 3400 | 3592 | 3521 |
| | Internal Bond (psi) | — | 140 | 191 | 200 | 100 | 196 | 169 |
| | Screw Holding (lbs.) | — | 357 | 495 | 580 | 400 | 501 | 358 |
| | After 24 hrs. Immersion in Water - | | | | | | | |
| | - Thickness Swell (%) | — | 4.5 | 4.1 | 3.5 | 5.0 | 1.3 | 1.2 |
| | - Water Absorption (%) | — | 11.3 | 10.2 | 11.1 | 17.0 | 10.8 | 11.4 |

The above data indicate that components I and II can be separately produced for present or future use, and then easily admixed to produce a curable amino resin useful as an adhesive. Storage does not adversely alter the viscosity of the components. Inasmuch as components I and II, whether stored or immediately used, are combined immediately prior to the point of use, the resin particles tend to be smaller in size than the partially reacted particles of conventional high viscosity amino resins. Accordingly, the high solids content, low viscosity resin produced from the two component system of the present invention permits a greater number of resin particles to be bonded to each fibrous particle. Board strengths are increased and mixing problems reduced. The two component system provides a commercially practical means for the production of a superior curable amino resin in far shorter time, with greater ease and at less expense than heretofore considered possible for resins of this type.

The amino resins produced in accordance with the present invention can be used as adhesives to improve the strength properties of paper and to laminate materials such as plywood, for example. The resin can be bonded to both organic and inorganic fibers, including fibers formed from (1) steamed and mechanically and/or chemically reduced cellulosic or lignocellulosic material such as wood, newspaper, cotton, straw, bamboo, bagasse, and sisal, and (2) inorganic materials such as asbestos or mineral wool. In general, the resin can be used in connection with any fibrous material in which the fibers have width and thickness approximately equal and considerably shorter in extent than their length.

Additives such as sizes, natural and synthetic waxes, fungicides, pesticides, natural and synthetic rubber, asphalt and/or coal-tar oils, and drying oils can be combined with the fiber in the conventional way. Preferably such additives are combined with the fiber during the impregnation of the fiber with the resin.

The viscosity of the curable amino resin may vary from about 20 cps. at 77° F. to about 500 cps. at 77° F. depending on the formulation of components I and II and the time interval between the mixing and application steps. Board thicknesses, as well as mixing and pressing times and temperatures, can also be varied without departing from the scope of the invention.

Having thus described the invention in rather full detail, it will be apparent that these details need not be strictly adhered to but that various changes and modifications may suggest themselves to one skilled in the art, all falling within the scope of our invention as defined by the subjoined claims.

We claim:
1. A fiberboard comprising fibrous material impregnated with a curable amino resin, said resin being prepared by a process comprising the steps of:
   a. mixing the following ingredients to form component I:
      1. from about 15 to about 25 weight percent urea;
      2. from about 30 to about 70 weight percent formaldehyde;
      3. from about 4.5 to about 10 weight percent melamine;
      4. from about 10 to about 30 weight percent water;
      5. from about 0.05 to about 4.0 weight percent stabilizer, said stabilizer comprising a buffering agent which maintains the pH of the composition within the range from about 4.0 to about 7.5;
   b. mixing the following ingredients to form component II:
      1. from about 35 to about 50 weight percent urea;
      2. from about 45 to about 65 weight percent water; and
      3. from about 0.5 to about 3.0 weight percent catalyst which promotes the reaction of urea, melamine and formaldehyde; and
   c. mixing together from about 40 to about 60 parts of component I with correspondingly from about 60 to about 40 parts of component II to form the curable amino resin.
2. A fiberboard as recited in claim 1, wherein the urea and formaldehyde of component I are added in the form of an aqueous urea-formaldehyde concentrate.
3. A fiberboard as recited in claim 1, wherein the stabilizer is an ammonium salt of an organic or an inorganic acid which maintains the pH of component I at a value ranging from about 4.0 to about 7.5.
4. A fiberboard as recited in claim 1, wherein the stabilizer is ammonium acetate.
5. A fiberboard as recited in claim 1, wherein the stabilizer is boric acid.
6. A fiberboard as recited in claim 1, wherein said impregnated fibrous material is formed into a mat and compressed to a desired thickness between pressing platens maintained at a temperature above 280° F and at a pressure above 500 psi, until the resin becomes intimately bonded to the fibrous material.
7. A fiberboard comprising fibrous material impregnated with a curable amino resin, said resin being prepared by:
   a. mixing the following ingredients to form component I:
      1. from about 20 to about 25 weight percent urea;
      2. from about 45 to about 60 weight percent formaldehyde;
      3. from about 4.5 to about 6.5 weight percent melamine;
      4. from about 20 to about 25 weight percent water;
      5. from about 0.1 to about 1.0 weight percent stabilier, said stabilizer comprising a buffering agent which maintains the pH of the composition at a value ranging from about 5.0 to about 6.5;
   b. mixing the following ingredients to form component II:
      1. from about 35 to about 50 weight percent urea
      2. from about 45 to about 65 weight percent water; and
      3. from about 0.5 to about 3.0 weight percent catalyst which promotes the reaction of urea, melamine and formaldehyde; and
   c. mixing together from about 40 to about 60 parts of component I with correspondingly from about 60 to about 40 parts of component II to form the curable amino resin.
8. The fiberboard as recited in claim 7 wherein the stabilizer is selected from the group consisting of ammonium acetate, ammonium borate, boric acid, sulfuric acid, hydrochloric acid, formic acid, acetic acid, stearic acid and mixtures of ammonium hydroxide and boric acid.
9. a fiberboard as recited in claim 6 wherein the stabilizer is ammonium acetate.
10. A fiberboard as recited in claim 3, wherein said catalyst is selected from the group consisting of ammonium chloride, ammonium nitrate, ammonium phosphate, aluminum phosphate, ammonium sulfate and aluminum ammonium sulfate.
11. A fiberboard as recited in claim 7, wherein said fibrous material is formed into a mat and impregnated to a desired thickness between pressing compressed and at a pressure above 500 psi, until the resin becomes intimately bonded to the fibrous material.
12. A fiberboard as recited in claim 11, wherein the ingredients of component I are mixed at a temperature ranging from about 50° to about 150° F.
13. A fiberboard as recited in claim 11 wherein the ingredients of component II are mixed at a temperature ranging from about 50° to about 150° F.

14. A fiberboard as recited in claim 11 wherein the components I and II are combined at a temperature ranging from about 50° to about 90° F.

15. A fiberboard as recited in claim 11 wherein from about 45 to about 55 parts of component I are combined with from about 45 to about 55 parts of component II.

16. A fiberboard as recited in claim 11, wherein the urea and formaldehyde of component I are added in the form of an aqueous urea-formaldehyde concentrate.

* * * * *